United States Patent [19]

Ziaylek, Jr.

[11] Patent Number: 4,467,997
[45] Date of Patent: Aug. 28, 1984

[54] DEVICE FOR CLAMPING FIRE HOSES AND THE LIKE

[76] Inventor: Theodore Ziaylek, Jr., 140 Riverview Dr., Yardley, Pa. 19067

[21] Appl. No.: 416,440

[22] Filed: Sep. 10, 1982

[51] Int. Cl.³ .............................................. F16L 55/14
[52] U.S. Cl. .......................................... 251/7; 251/10
[58] Field of Search ................................. 251/4, 7–10

[56] References Cited

U.S. PATENT DOCUMENTS

| | | |
|---|---|---|
| 820,216 | 5/1906 | Leffingwell et al. |
| 1,761,721 | 6/1930 | Gipe . |
| 1,809,091 | 6/1931 | Wiken . |
| 2,150,262 | 3/1939 | Brittain . |
| 2,245,030 | 6/1941 | Gottesfeld et al. ..................... 251/7 |
| 2,663,537 | 9/1953 | Gagne . |
| 2,954,028 | 9/1960 | Smith . |
| 3,147,754 | 9/1964 | Koessler ................................. 251/7 |
| 3,156,444 | 11/1964 | Black . |
| 3,874,042 | 4/1975 | Eddleman et al. ................... 251/10 |
| 4,081,170 | 3/1978 | Doss, Jr. . |

FOREIGN PATENT DOCUMENTS 440782  5/1927  Fed. Rep. of Germany .

Primary Examiner—Martin P. Schwadron
Assistant Examiner—Sheri Novack
Attorney, Agent, or Firm—Sperry, Zoda & Kane

[57] ABSTRACT

A portable device, capable of being hand carried to a selective location along the length of a fire hose at the scene of a fire, is adapted to be swiftly and easily opened by reason of a hinged relationship of its basic parts, to receive the hose. When swung to a closed position about the hose, the clamping device automatically latches and locks in the closed position, to locate stationary and movable jaws at diametrically opposite points on the hose. Then, by operation of a hydraulic means incorporated directly in the device, the movable jaw is forced toward the stationary jaw, to clamp off the hose. The jaws have a particular configuration adapting the same to tightly clamp the hose against any leakage of water therethrough. For this purpose, the stationary jaw, in the sense of the transverse dimension of the hose, is shallowly depressed to define a cradle that will center the hose for clamping purposes, with the upper jaw having a mating convexity in the sense of the transverse dimension of the clamped object. The stationary jaw is also formed with upwardly convergent surfaces arranged to define a low, rounded clamping surface that will extend across the full diameter of the hose and that follows the shallow concavity defined by the cradle, while the movable upper jaw has downwardly convergent surfaces defining a gently rounded clamping surface cooperating with that of the stationary jaw. The clamping surface of the upper jaw mates with the lower jaw by reason of having a convexity complementing the concavity defined by the cradle.

5 Claims, 9 Drawing Figures

DEVICE FOR CLAMPING FIRE HOSES AND THE LIKE

BACKGROUND OF THE INVENTION

1. Field of the Invention

This invention relates generally to clamping devices. In a more specific sense, the invention relates to a clamping device adapted to be placed about a flexible, tubular member such as a fire hose, for the purpose of shutting off the flow of water therethrough.

2. Description of the Prior Art

Clamping device for fire hoses are well known in and of themselves. It often happens, for example, that a fire hose may extend a substantial distance from its coupling to a hydrant. In the use of the hose, a fireman controlling the hose at the nozzle end needs to have, in many instances, quick control over the flow. He may, for example, have to cut off the flow completely, while moving the hose or performing other duties. Then, it may be necessary that he start up the flow once again with equal speed and ease.

Typically, a hose connection is made between a hydrant and the inlet of a pump on the fire-fighting equipment. The pressure at the pump inlet is the relatively low hydrant pressure (e.g., 30 psi). The pump raises this to about 150 psi, typically in the hose extending from the pump outlet to the nozzle. It is in the high pressure portion of the hose that the cut-off clamp is used.

In some instances, cutting off the high pressure flow can be achieved by signaling the operator at the pump. This may be difficult, however, in some instances because of the distances involved, and because the operator at the pump may be out of view of the fireman working at the discharge end of the hose. Indeed, it may also be true that the pump may be left unattended for one reason or another.

Accordingly, it is desirable to use clamping devices, normally adjacent the discharge end of the hose, and these devices are typically of a readily portable character, so that they can be quickly placed in position about a hose, and used for the purpose of clamping off the hose to shut off the flow, for example when a hose ruptures or when a nozzle needs to be changed. Such clamping devices are so designed as to permit the flow to be resumed, with minimum loss of time, should this be necessary.

One of the main problems encountered, in the prior art, is to provide a jaw formation on the clamping device, that will be designated to effective shut off the flow through the fire hose under the application of mechanical or hydraulic pressure. The jaw formation is of extreme importance, because a fire hose can be, for example, approximately five inches in diameter, and exerts very heavy resistance to the clamping action.

It is also very important that the jaws be adapted for clamping off the hose without rupturing or otherwise damaging it. This presents a problem in light of the fact that the hoses are of fabric material and carry water at high pressure.

It is important, accordingly, to provide a clamping device that will have a jaw formation that is of particular effectiveness in shutting off flow through the fire hose upon the application of suitable pressure, which is normally exerted hydraulically by the provision of a hydraulic pump assembly incorporated in the clamp device.

SUMMARY OF THE INVENTION

Summarized briefly, the invention is a clamping device of the general type described previously herein, in which a base is formed with a lower clamping jaw having a particular shape found effective, in cooperation with an upper clamping jaw, in shutting off flow through a fire hose upon the application of suitable hydraulic pressure to the upper jaw.

Essentially, the clamping device comprised in the present invention has a base on which is formed an upwardly facing lower jaw. Hinged to the base is a yoke of inverted U-shape which can be swung to an open position to permit the clamp to receive a fire hose. The yoke is formed open at its opposite sides to permit passage of the hose therethrough.

A fixed jaw formed on the base has, in the sense of the transverse dimension of the hose extending through the device, a centrally depressed surface defining a cradle for centering the hose in the device. The same jaw, though shallowly recessed in the sense of the transverse dimension of the hose, is protruberant or bulged in the sense of the longitudinal dimension of the hose.

When the yoke swings to a closed position, it latches automatically in the closed position. Carried by the yoke is a movable upper jaw and a hydraulic means for urging the upper jaw toward the fixed jaw. The upper jaw, in the sense of the transverse dimension of the hose, is shallowly protruberant, complementarily to the shallow recessing or concavity of the fixed jaw in the sense of the transverse dimension of the hose. In the sense of the longitudinal dimension of the hose, however, the movable jaw is in the form of an inverted isosceles triangle, that is to say, it has downwardly convergent surfaces meeting at an apex which is rounded off to prevent damage to the hose when the movable jaw is directed thereagainst. Upon operation of the hydraulic mechanism, the movable jaw is guided toward the fixed jaw, through the provision of cooperating guide slots and lugs on the yoke and movable jaw respectively, until flow through the hose is cut off completely.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

The clamping device comprising the present invention includes a base 10 cast or otherwise formed in a single piece to include an upwardly facing cradle or lower stationary jaw 12 which in the sense of the transverse dimension of a fire hose "H" (see FIG. 1) has a shallow concavity defined by shallowly, oppositely sloped crest surfaces 14 meeting at a low point 15 to center the hose "H" in the clamping device.

Figure 6:
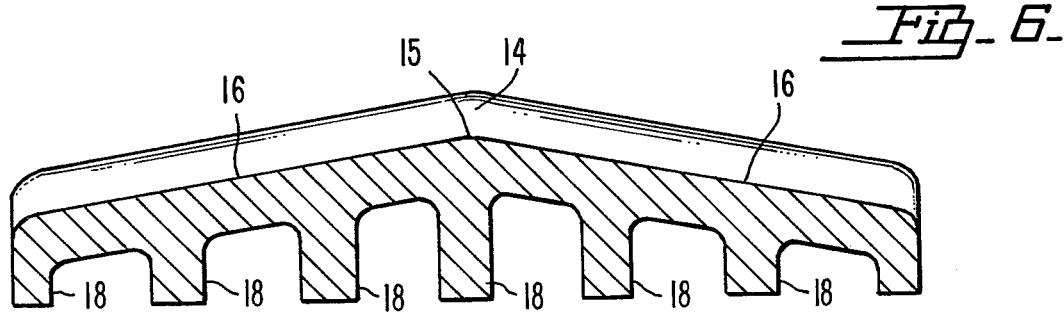
FIG. 6 is a sectional view through the fixed jaw per se with the yoke removed, taken substantially on line 6—6 of FIG. 1.

In the sense of the longitudinal dimension of the hose (FIGS. 2 and 6), shallowly sloped, upwardly convergent surfaces 16 meet along the crest area 15 to give the lower jaw a saddleback configuration. Parallel, integral, underlying strengthening ribs 18 extend from end to end of the saddleback to prevent collapse of the jaw under the application of heavy clamping pressures.

Figure 1:
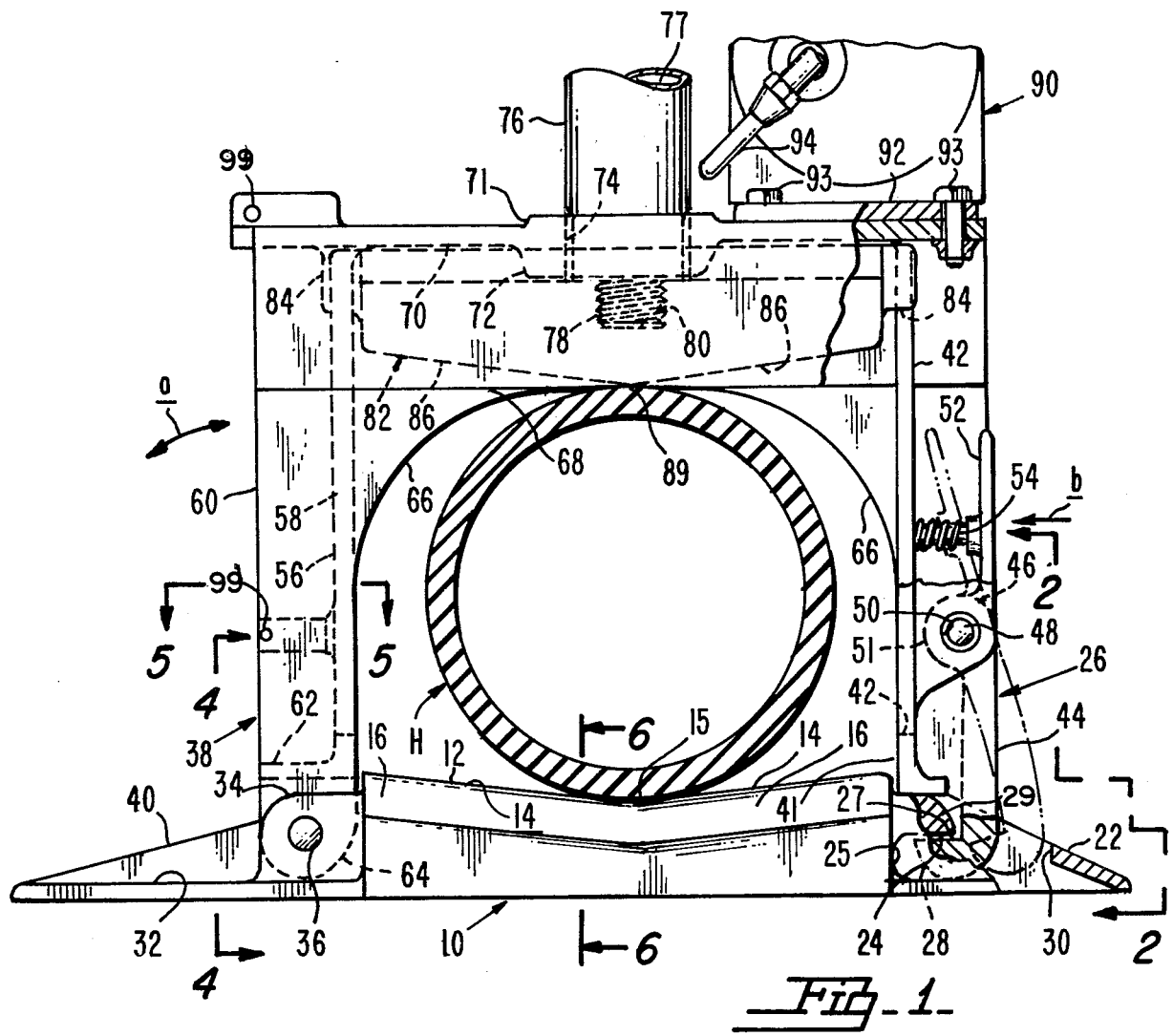
FIG. 1 is a view of the clamping device formed according to the present invention, a portion of the hydraulic assembly being cut away, the clamping device being illustrated in elevation looking through the open side of the yoke, with a fire hose being illustrated in cross section, the movable jaw being retracted and portions of the clamping device being sectioned away.
Figure 3:
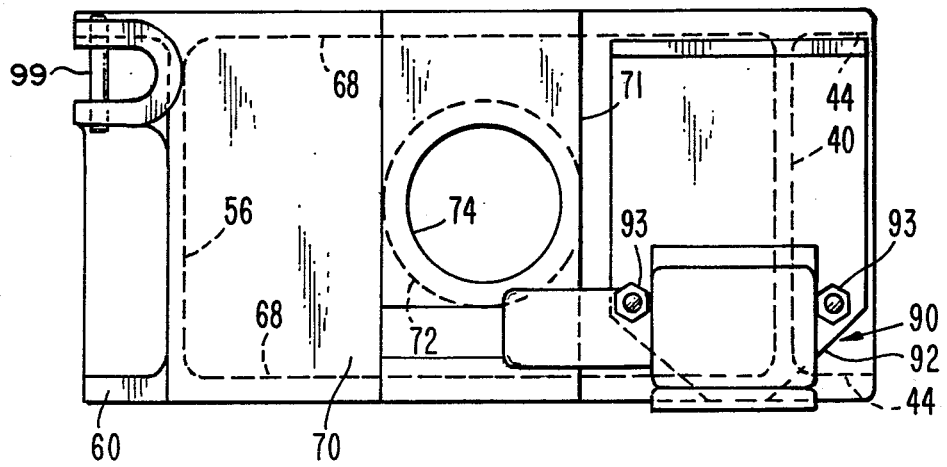
FIG. 3 is a top plan view of the clamping device with the hose omitted.

Extending from one end of the saddleback is a horizontal end plate 20 (FIGS. 1 and 2) integral with vertical, transversely spaced latch plate retainer walls 22 between which extends a downwardly facing latching shoulder 24 defining latch recess 25 for an elongated, generally vertically extending latch element 26 having at its lower end a hook or dog 27 engageable in recess 25 and formed with a rounded, downwardly facing cam surface 28 adapted to engage upwardly facing cam surface 29 of base 10 for pivoting the latch outwardly until it clears shoulder 24 and engages in recess 25 in its latching position illustrated in FIG. 1. The confronting surfaces 24, 27 are at a rake angle of 10% preferably, for maximum effective locking.

Extending between and reinforcing the retaining walls 22 is a hose guide plate 30 integral with the retaining walls. It is at a shallow angle so that the device can be slid easily under the hose.

Figure 4:
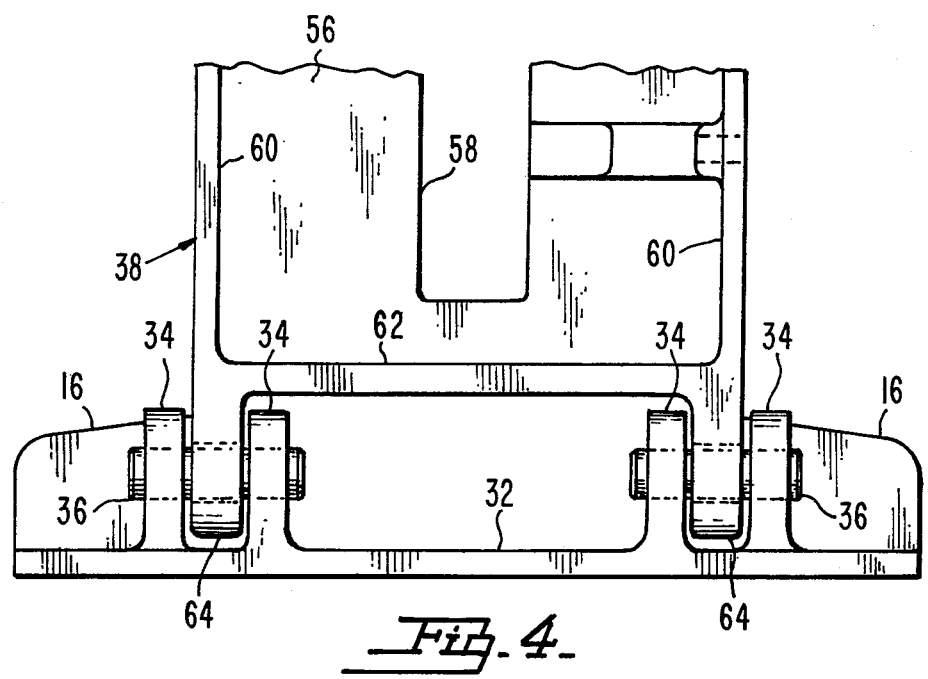
FIG. 4 is a fragmentary elevational view of the clamping device as seen from line 4—4 of FIG. 1.

At the other end of the lower jaw 12, a horizontal end plate 32 of base 10 is integral with the jaw, extending outwardly therefrom to provide a support for transversely spaced, vertically disposed pairs of hinge plates 34 (FIG. 4) receiving hinge pins 36 pivotally connecting a yoke 38 of inverted U-shape to the base. Extending outwardly from and reinforcing each hinge plate 34 is a triangular gusset 40 integral with end plate 32 and each of the hinge plates, and extending outwardly to provide a wide, stable base that will keep the device from tipping over when open.

Yoke 38 is swingable about a pivot axis defined by hinge pins 36, in the direction of the arrow "a" of FIG. 1, between an open position (not shown) permitting entry of the hose from the right in FIG. 1 in a direction transversely of the hose as shown by direction arrow "b", after which the yoke is swung back to the closed position shown and locked by engagement of the latch element 26 in recess 25. The yoke being of inverted U-shape, and the base being generally horizontal, there is defined thereby, in the closed yoke position, a rectangular, open center frame receiving hose "H" as shown in FIG. 1. One side wall of the frame is defined by side wall 41 of the yoke, which has (FIGS. 1 and 2) an elongated, wide, vertical, closed guide slot 42. Along the opposite side edges of wall 41, reinforcing flanges 44 are integrally formed thereon. Inwardly of the flanges 44, transversely spaced, outwardly projecting latch element pivot plates 46 receive pivot pin 48 insertible through one or the other of axially aligned clearance openings 50 of flanges 44. Pin 48 extends through transversely spaced ears 51 of latch element 26, mounting the latch element for limited swinging movement between the full line latching position and dotted line unlatching position thereof shown in FIG. 1.

At its upper end, latch element 26 is integral with a flat extension 52 against which one may exert finger pressure to disengage the latch against the restraint of compression coil springs 54 interposed between the latch element and side wall 41 of the yoke at opposite sides of guide slot 42.

The other side wall 56 of yoke 38 is formed with a vertical guide slot 58 identical to slot 42, and is reinforced along its vertical edges by outwardly extending flanges 60 between which an integral cross member 62 extends below the lower end of the guide slot. Flanges 60 (see FIG. 4) have downwardly projecting extensions 64 at their lower ends, apertured to receive the hinge pins 36.

Figure 7:
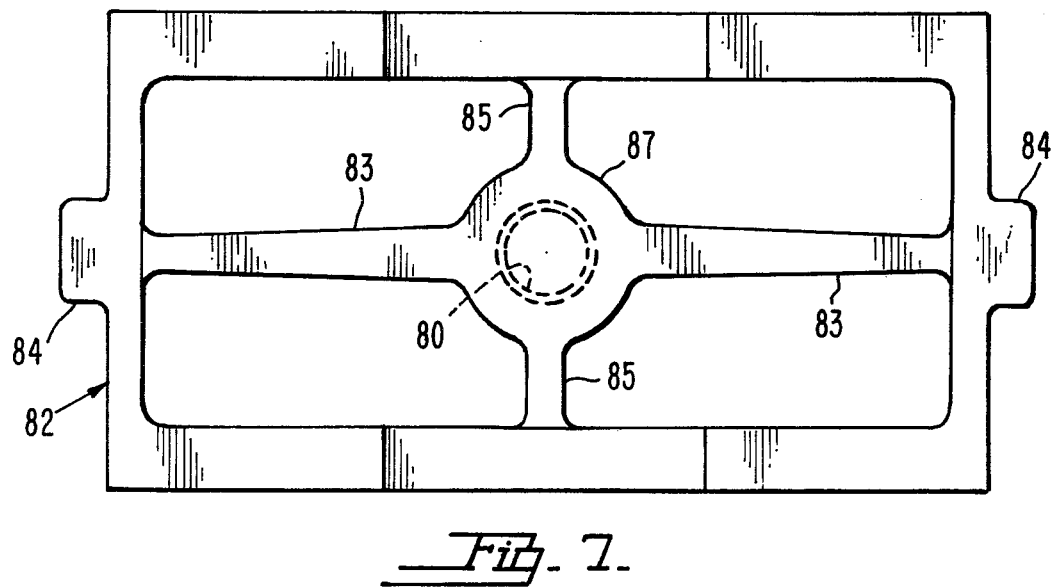
FIG. 7 is a top plan view of the movable or upper jaw, per se.
Figure 8:
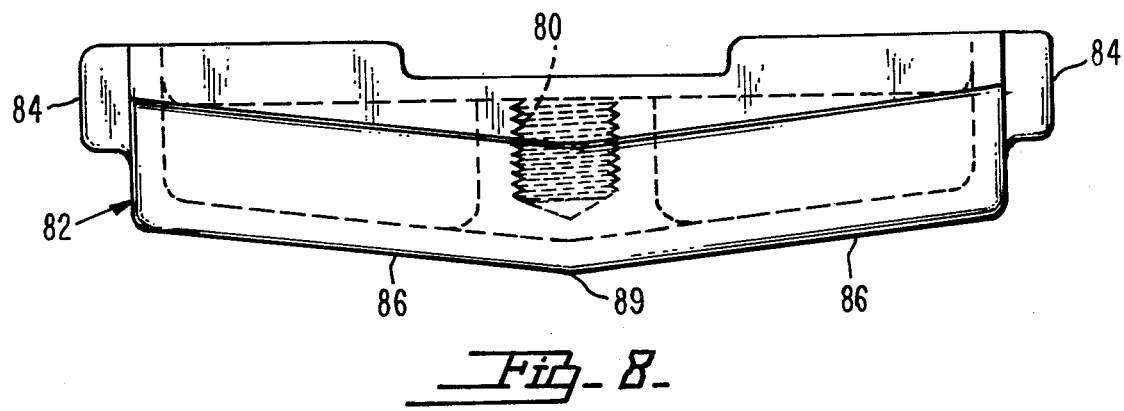
FIG. 8 is a side elevational view of the upper jaw.
Figure 9:
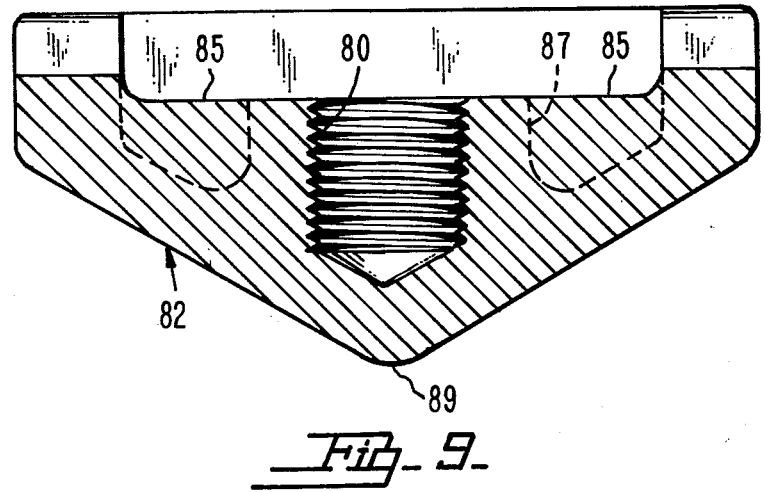
FIG. 9 is a transverse sectional view through the upper jaw, on line 9—9 of FIG. 8.

Curved gussets 66 integral with the respective side walls 41, 56 of the yoke, are also integral with top flanges 68 of a top plate 70 of the yoke extending between and integrally connected to the upper ends of the side walls 41, 56, the side walls also being integral with the respective flanges 68. Midway between opposite ends of top plate 70, a raised area 71 imparts added thickness thereto in the area of a downwardly projecting center boss 72, integrally formed upon the underside of the top plate and having a large diameter opening 74 in which is secured an upwardly projecting hydraulic piston chamber 76, having therein a piston 77 formed with a stud 78 threaded for engagement in an upwardly opening threaded recess 80 of a movable jaw 82 (FIGS. 7-9), having at its opposite ends guide lugs 84, and formed with reinforcing ribs 83, 85 radiating from a circular center portion 87 in which recess 80 is provided.

Figure 2:
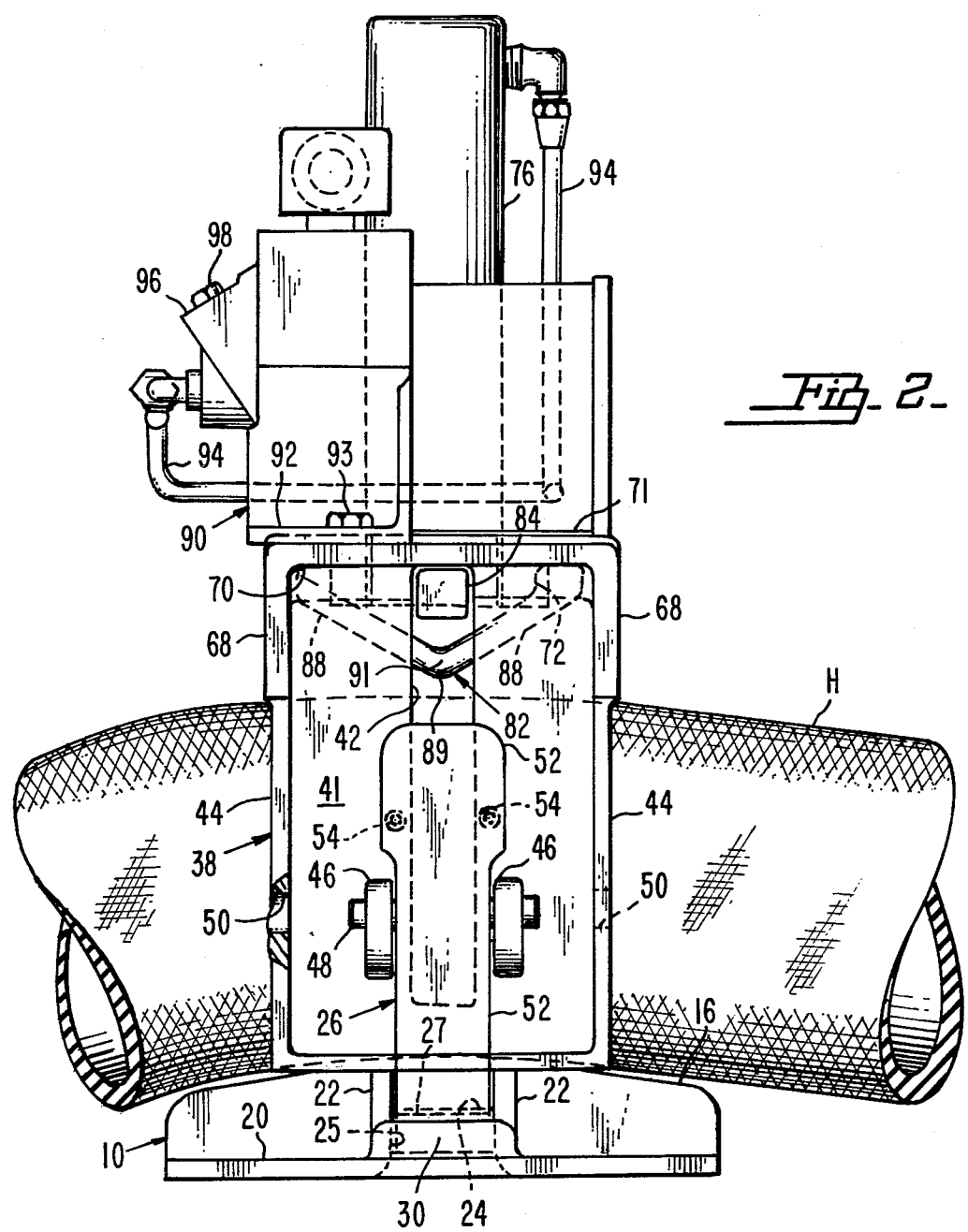
FIG. 2 is a view of the clamping device as seen from the line 2—2 of FIG. 1.

Jaw 82 has a downwardly facing pair of clamping surfaces 86 shallowly convergent so as to meet at an apex portion 89. Surfaces 86 converge downwardly in the sense of the transverse dimension of hose "H" as shown in FIG. 1. Also downwardly convergent on the movable jaw are side surfaces 88, which are more steeply inclined than the surfaces 86 as shown in FIG. 2. Surfaces 88 are sloped downwardly into converging relation in the sense of the length of the hose "H" as shown in FIG. 2. Surfaces 86, 88 cooperate in forming, on the upper jaw, a rounded, downwardly protruberant ridge 91 (FIG. 2) vertically aligned with the concavely formed ridge produced by the saddleback form of the lower jaw 12.

Mounted upon the top plate is a hydraulic assembly 90 which in and of itself is basically conventional and hence needs no special description. It may, for example, be formed as shown in U.S. Pat. No. 4,081,170, issued to Doss, Jr., the disclosure of which, so far as the hydraulic system is concerned, is incorporated herein by reference. A hydraulic system is preferred, but the invention does not rule out the possibility of a mechanical means for advancing and retracting the upper jaw.

Figure 5:
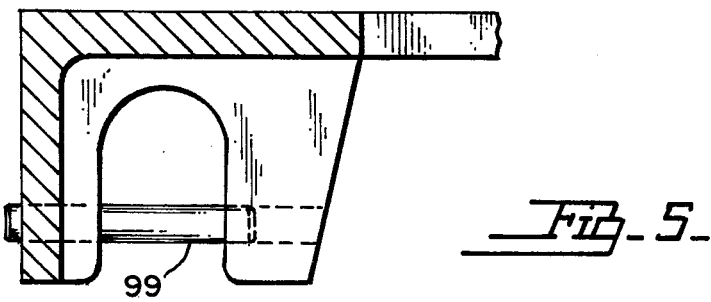
FIG. 5 is a detailed sectional view taken substantially on line 5—5 of FIG. 1.

In any event, in a typical arrangement the hydraulic means 90 can be mounted upon a right angled plate 92 secured to top plate 70 of yoke 38 by means of mounting screws 93, and may incorporate an input line 94 leading to an oil reservoir 96 having a combined filler cap and dip stick 98. A suitable pump handle, not shown, would be provided for pumping fluid into the upper end of the reservoir for advancing the plunger or piston 77, whereby to shift the movable jaw downwardly so as to pinch off the hose "H" between the upper and lower jaws for reducing or completely cutting off the flow of water. Referring to FIG. 5, one or more keepers or retainers 99 can be provided for accommodating the handle during transport or indeed, whenever it is not in use.

In use, with the movable jaw retracted to the position shown in FIG. 1, one disengages the latch, and then swings the yoke to a full open position, to permit the device to be positioned about the hose "H". The yoke is then swung to closed position, with the latch cam surface 28 engaging cam surface 29 of the base to temporarily bias the latch to the dotted line position shown in FIG. 1, after which the latch under the force of springs 54 engages in the full line, latching position illustrated in this figure of the drawing. Then, hydraulic fluid is pumped into the reservoir, to force the movable jaw downwardly until the water supply has been restricted to a selected extent, or alternatively and more usually, completely stopped.

The particular formation of the jaws has been found to be especially effective, in the device as illustrated, in achieving the desirable end of quickly cutting off the water supply. The provision of a saddleback form in one of the jaws, with a complementary protuberance on the other jaw, and with both jaws having vertically aligned ridges one of which is shallowly concave with the other being shallowly convex, has been found to produce especially desirable results in cutting off the water supply, without damage to the hose.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A device for clamping an elongated, tubular flexible body such as a fire hose, comprising:
   (a) a base formed with a stationary, upwardly facing lower jaw having, in the sense of the transverse dimension of a tubular, flexible body to be clamped, a shallowly V-shaped concavity defined by oppositely sloped, flat crest surfaces defining between them a wide, upwardly opening obtuse angle, and meeting at a central low point to receive and center between them the body to be clamped, said jaw, in the sense of the longitudinal dimension of said body, having flat, shallowly sloped, flat surfaces defining a wide, downwardly opening obtuse angle the apex of which coincides with said central low point;
   (b) a yoke of inverted U-shape having a hinge connection to one side of the base about which the yoke is swingable about an axis paralleling the length of said body between a position providing an opening above the other side of the base through which said body may be inserted and removed, and a closed position in which the yoke and base cooperate to define a generally rectangular frame in which said body is confined in a position in which it is centered upon said low point, said yoke including
      (1) a top plate and
      (2) side walls extending downwardly from the top plate, said hinge connection being provided on one of said walls;
   (c) latch means on the base and on the other side wall cooperating to releasably latch the yoke to the base in the closed position of the yoke;
   (d) a movable jaw extending between the side walls of the yoke and slidably mounted thereon for movement toward and away from the stationary jaw, said movable jaw having in the sense of the transverse dimension of said body a pair of flat, downwardly facing clamping surfaces defining between them an upwardly opening obtuse angle, said clamping surfaces of the movable jaw being downwardly shallowly convergent to meet at a central apex portion vertically aligned with the low point defined between the first-named surfaces of the stationary jaw, said movable jaw additionally having a pair of flat side surfaces that in the sense of the longitudinal dimension of the body to be clamped, are downwardly, shallowly convergent at an obtuse angle to each other the apex of which coincides with said central apex portion defined by the first named surfaces of the movable jaw; and
   (e) means for shifting the movable jaw toward the lower jaw to clampably engage said tubular, flexible body between the jaws.

2. A clamping device as in claim 1 wherein the second named surfaces of the movable jaw are inclined more steeply than are the first named surfaces of said movable jaw.

3. A clamping device as in claim 2 wherein the angle defined between the first named surfaces of the stationary jaw is approximately equal to that defined between the first named surfaces of the movable jaw.

4. A clamping device as in claim 3 wherein the obtuse angle defined by the second named surfaces of the movable jaw is distinctly less than the obtuse angle defined by the first named surfaces of the movable jaw.

5. A clamping device as in claim 4 wherein the obtuse angle defined by the second named surfaces of the movable jaw is less than the angle defined by the first named surfaces of the stationary jaw, and is also less than the angle defined by the second named surfaces of the stationary jaw.

* * * * *